Patented June 18, 1940

2,205,101

UNITED STATES PATENT OFFICE 2,205,101

VULCANIZATION OF RUBBER

Joy G. Lichty, Stow, Ohio, assignor to Wingfoot Corporation, Wilmington, Del., a corporation of Delaware No Drawing. Application June 19, 1937, Serial No. 149,202

13 Claims. (Cl. 260—788)

This invention relates to the vulcanization of rubber. More particularly, it relates to the vulcanization of rubber in the presence of a material selected from a new group of substances which have been found to be efficient accelerators yielding vulcanized rubber products of very good physical characteristics.

Many accelerators of the vulcanization of rubber are known, the compounds serving as such belonging to various chemical classes. It has now been found that the materials obtainable by reacting an amino benzothiazole with sulfur constitute a class of desirable accelerators not hitherto known or applied to this purpose. Thus, this invention contemplates utilizing the 2-amino benzothiazoles which have little or no accelerating powers and reacting these non-accelerating compounds with sulfur to yield new materials which are very efficient accelerators of the vulcanization of rubber.

The amino benzothiazoles which may be reacted with sulfur to obtain the new accelerators are those corresponding to the formula

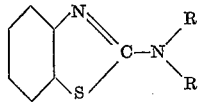

in which R is hydrogen or an alkyl, aralkyl, aryl or alicyclic group or a substituted derivative of one of these groups. Thus, among the compounds useful in the invention are 2-methylamino benzothiazole, 2-ethylamino benzothiazole, 2-isobutylamino benzothiazole, 2-N-heptylamino benzothiazole, 2-anilino benzothiazole, 2-(orthomethoxy phenylamino) benzothiazole, 2(parahydroxyphenylamino) benzothiazole, 2 - alpha naphthylamino benzothiazole, 2-cyclohexylamino benzothiazole, 2-diamylamino benzothiazole, 2-di-isopropylamino benzothiazole, 2 - diphenyl amino benzothiazole, 2-(orthochlorphenylamino) benzothiazole, 2-orthotolylamino benzothiazole, etc. The disubstituted amino benzothiazoles constitute a preferred class.

Any of the foregoing amino benzothiazoles or others coming within the broad class may be reacted with sulfur to yield a material of unknown constitution which may then be employed in rubber as an accelerator of vulcanization. The following example illustrates a method for the preparation of the compounds:

A mixture of 46.4 grams of 2-piperidyl benzothiazole and 6.4 grams of sulfur was heated in a glass bomb tube to 240–250° C. for four hours. The cooled reaction product was a sticky mass. This mass was treated with 150 cc. of benzene, which treatment left a residue of 5 grams identified as 2-mercapto-benzothiazole. The benzene extract was evaporated to yield 46.5 grams of a dark red liquid which was taken as the reaction product.

Any other amino benzothiazole falling within the broad class may be similarly reacted with sulfur to yield products useful in the invention. The foregoing example is merely illustrative of the method of reaction, and other conditions of temperature, proportions of reactants, etc. may be employed, although in general it will be desirable to conduct the reaction at a temperature of 190° to 270° C.

The accelerators of the invention may be employed in most or all of the usual rubber compounding formulae. The following is one in which they have ben found by test to yield excellent results.

| | Parts by weight |
|---|---|
| Smoked sheet | 100 |
| Zinc oxide | 5 |
| Sulfur | 3 |
| Accelerator | 0.5 |

When the product obtained according to the procedure outlined in the foregoing example illustrating the method of preparation of the accelerators was incorporated into rubber in accordance with this formula and samples were cured and tested, the following results were obtained:

| Cure, min./deg. F. | Tensile, kg./in.² | Elongation, percent | Modulus | |
|---|---|---|---|---|
| | | | 500% | 700% |
| 20/260 | 106 | 840 | 16 | 49 |
| 30 | 140 | 820 | 21 | 72 |
| 40 | 164 | 810 | 25 | 84 |
| 60 | 165 | 800 | 27 | 94 |
| 80 | 168 | 790 | 29 | 102 |

These data demonstrate the excellent accelerating qualities possessed by the compounds although the 2-aminobenzothiazoles from which they are prepared have little or no accelerating power.

Although only the preferred forms of the invention have been described, many variations may be made therein without departing from the spirit of the invention or the scope of the appended claims in which it is intended to include all patentable novelty inherent in the invention.

I claim:

1. The method of treating rubber which comprises vulcanizing the same in the presence of the product obtained by reacting sulfur and a 2-amino benzothiazole at a temperature between about 190° and 270° C.

2. The method of treating rubber which comprises vulcanizing the same in the presence of the product obtained by reacting sulfur and 2-piperidyl benzothiazole at a temperature between about 190° and 270° C.

3. The method of treating rubber which comprises vulcanizing the same in the presence of the product obtained by reacting sulfur and a 2-alkylamino benzothiazole at a temperature between about 190° and 270° C.

4. The method of treating rubber which comprises vulcanizing the same in the presence of the product obtained by reacting sulfur and a 2-dialkylamino benzothiazole at a temperature between about 190° and 270° C.

5. The method of treating rubber which comprises vulcanizing the same in the presence of the product obtained by reacting sulfur and a 2-arylamino benzothiazole at a temperature between about 190° and 270° C.

6. The method of treating rubber which comprises vulcanizing the same in the presence of the product obtained by reacting sulfur and a 2-diarylamino benzothiazole at a temperature between about 190° and 270° C.

7. A rubber product which has been vulcanized in the presence of the product obtained by reacting sulfur and a 2-amino benzothiazole at a temperature between about 190° and 270 C.

8. A rubber product which has been vulcanized in the presence of the product obtained by reacting sulfur and 2-piperidyl benzothiazole at a temperature between about 190° and 270° C.

9. A rubber product which has been vulcanized in the presence of the product obtained by reacting sulfur and a 2-alkylamino benzothiazole at a temperature between about 190° and 270° C.

10. A rubber product which has been vulcanized in the presence of the product obtained by reacting sulfur and a 2-arylamino benzothiazole at a temperature between about 190° and 270° C.

11. A rubber product which has been vulcanized in the presence of the product obtained by reacting sulfur and a 2-dialkyl amino benzothiazole at a temperature between about 190° and 270° C.

12. A rubber product which has been vulcanized in the presence of the product obtained by reacting sulfur and a 2-diarylamino benzothiazole at a temperature between about 190° and 270° C.

13. The method of treating rubber which comprises vulcanizing the same in the presence of the product obtained by reacting sulfur and a compound having the formula

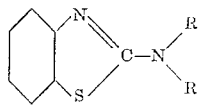

in which R is selected from the group consisting of hydrogen and alkyl, aralkyl, aryl and alicyclic groups at a temperature between about 190° and 270° C.

JOY G. LICHTY.